No. 885,959.
PATENTED APR. 28, 1908.
J. SCHILLEMAN.
LOG CONVEYER CHAIN.
APPLICATION FILED JUNE 24, 1907.
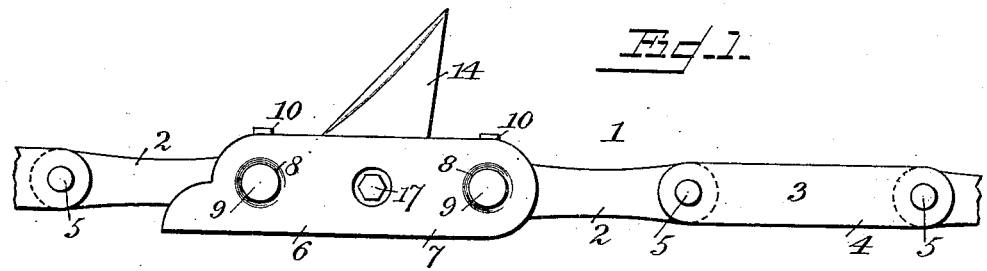
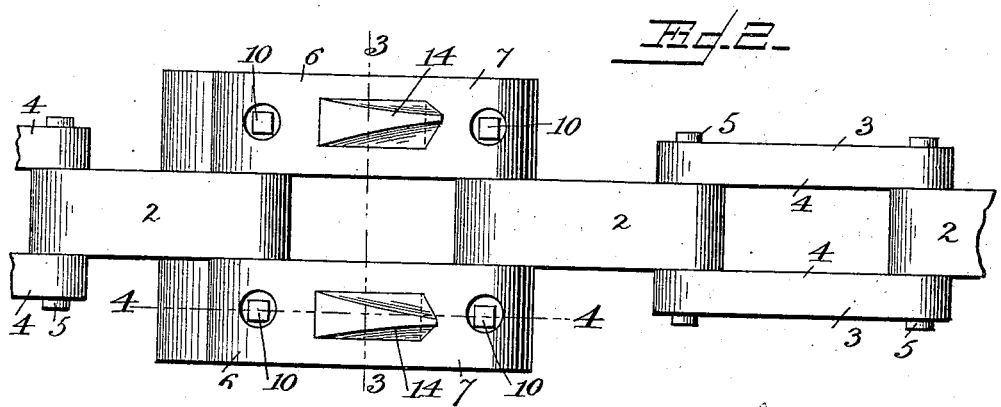
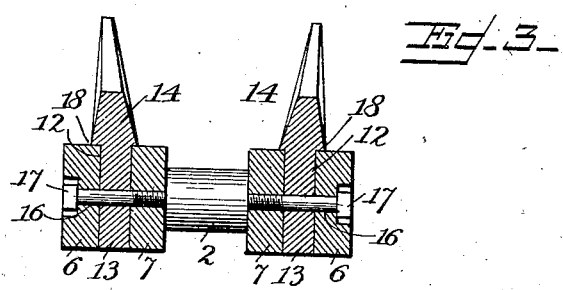
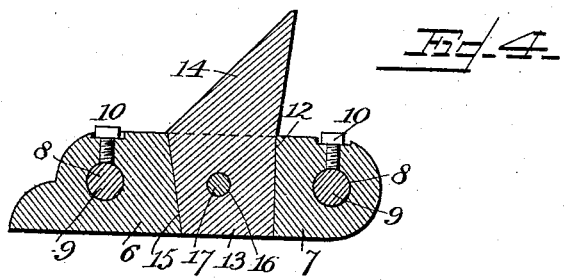
Witnesses
F. L. Ourand
C. H. Griesbauer
Inventor
Jacob Schilleman
by H. B. Willson & Co
Attorneys

UNITED STATES PATENT OFFICE.

JACOB SCHILLEMAN, OF WABENO, WISCONSIN.

LOG-CONVEYER CHAIN.

No. 885,959.  Specification of Letters Patent.  Patented April 28, 1908.

Application filed June 24, 1907. Serial No. 380,490.

*To all whom it may concern:*

Be it known that I, JACOB SCHILLEMAN, a citizen of the United States, residing at Wabeno, in the county of Forest and State of Wisconsin, have invented certain new and useful Improvements in Log-Conveyer Chains; and I do declare the following to be a full, clear, and exact description of the invention, such as will enable others skilled in the art to which it appertains to make and use the same.

This invention relates to improvements in log conveyer chains for carrying logs to a saw mill.

The object of the invention is to provide a chain of this character provided with dog carrying shoes, in which are detachably secured log engaging dogs, means being provided whereby the dogs may be readily removed from the shoes and sharpened or replaced by other dogs, and thus avoiding the necessity of losing the entire shoe when the dogs thereon have become broken or worn out.

With this object in view, the invention consists of certain novel features of construction, combination and arrangement of parts as will be more fully described and particularly pointed out in the appended claims.

In the accompanying drawings, Figure 1 is a side view of a section of conveyer chain constructed in accordance with the invention; Fig. 2 is a plan view of the same; Fig. 3 is a vertical cross sectional view on the line 3—3 of Fig. 2; and Fig. 4 is a vertical sectional view through one side of one of the dog carrying shoes of the chain on the line 4—4 of Fig. 2.

Referring more particularly to the drawings, 1 denotes the chain which consists of a series of solid links 2, connected together by open links, 3, formed by pairs of side plates, 4, the ends of which are mounted upon transversely disposed pivot bolts or rivets 5 arranged in the ends of the solid links, as shown. At suitable intervals along the length of the chain is arranged dog carrying shoes, 6, said shoes comprising pairs of substantially oblong blocks, 7, in the opposite ends of which are formed transversely disposed openings, 8, adapted to receive the ends of connecting pins or bolts, 9, which are passed through the ends of two solid links of the chain, as shown; the block 7 thus taking the place of one of the open links. The blocks 7 are held in engagement with the ends of the bolts or pins 9, by means of set screws, 10, which are screwed through the upper side of the blocks and into engagement with the pins, as clearly shown in Fig. 4 of the drawing.

In the blocks 7 are formed vertically disposed rectangular sockets 12, adapted to receive stems or shanks 13 of log engaging dogs 14, with which the shoes are provided. The rear end walls of the sockets 12 are formed on an incline as shown at 15 to receive the inclined rear end of the shank 13 of the dog. Through the blocks 7 and the shanks 13 are formed alined transversely disposed bolt holes, 16, through which are adapted to be inserted fastening bolts 17, the inner ends of which are threaded and adapted to be engaged with screw-threads formed in the hole 16 on the inner side of the block. The dogs 14 are preferably in the form of a triangularly shaped tooth on the lower edge of which is formed the shank or stem 13, said shank being of less thickness than the tooth, thereby forming an offset or shoulder, 18, along the base side of the tooth to engage the upper side of the block adjacent to the outer face of the same. The shoulder 18 forms a brace or support for the dogs and prevents the same from being turned over or spreading outwardly when engaged by the links.

By providing the shoes of the chain with engaging dogs, the latter may be readily removed when broken or dulled to permit the same to be sharpened or to permit other dogs to be engaged with the blocks of the shoes, thereby saving the cost of providing an entire new shoe or block when a dog has become broken or worn down. The detachable connection of the blocks with the pins or bolts of the chain links also permits of the removal of said blocks when necessary without cutting the link pins as is necessary in the usual construction of log chains, wherein said pins are headed on the outer sides of the shoes.

Having thus fully described my invention, what I claim as new and desire to secure by Letters-Patent, is:

1. A dog-carrying shoe for a log conveyer chain having a pair of blocks and connecting parts, each of said blocks being provided with an inclosed socket in its upper face intermediate of its side faces, lock-engaging dogs having shanks in said sockets, and means to hold said shanks in place.

2. A dog carrying shoe for log conveying chains, comprising pairs of blocks adapted to be engaged with the link pins of the chain, set screws adapted to be screwed through the ends of the blocks and into engagement with the ends of the link pins to detachably secure said blocks thereon, log engaging dogs having formed thereon reduced shanks adapted to be engaged with sockets formed in said blocks, shoulders formed along the base of said dogs to engage the upper side of the blocks, thus forming lateral supports or braces for the dogs, and fastening bolts adapted to be passed through said blocks and the shanks of the dogs to detachably secure the same in place, substantially as described.

3. A dog-carrying shoe for a log conveyer chain, comprising a pair of blocks and connecting parts, each of said blocks being provided with an inclosed socket in its upper face and intermediate of the side faces thereof, lock-engaging dogs with reduced shanks seating in said sockets, and screws to hold said shanks in place.

4. A dog-carrying shoe for a log-conveying chain, comprising a pair of blocks and connecting parts, a socket in each of said blocks, the forward wall of said socket being forwardly and downwardly inclined, dogs with shanks engaged in said sockets.

In testimony whereof I have hereunto set my hand in presence of two subscribing witnesses.

JACOB SCHILLEMAN.

Witnesses:
JOHN B. SCORY,
J. B. MALLOW.